UNITED STATES PATENT OFFICE.

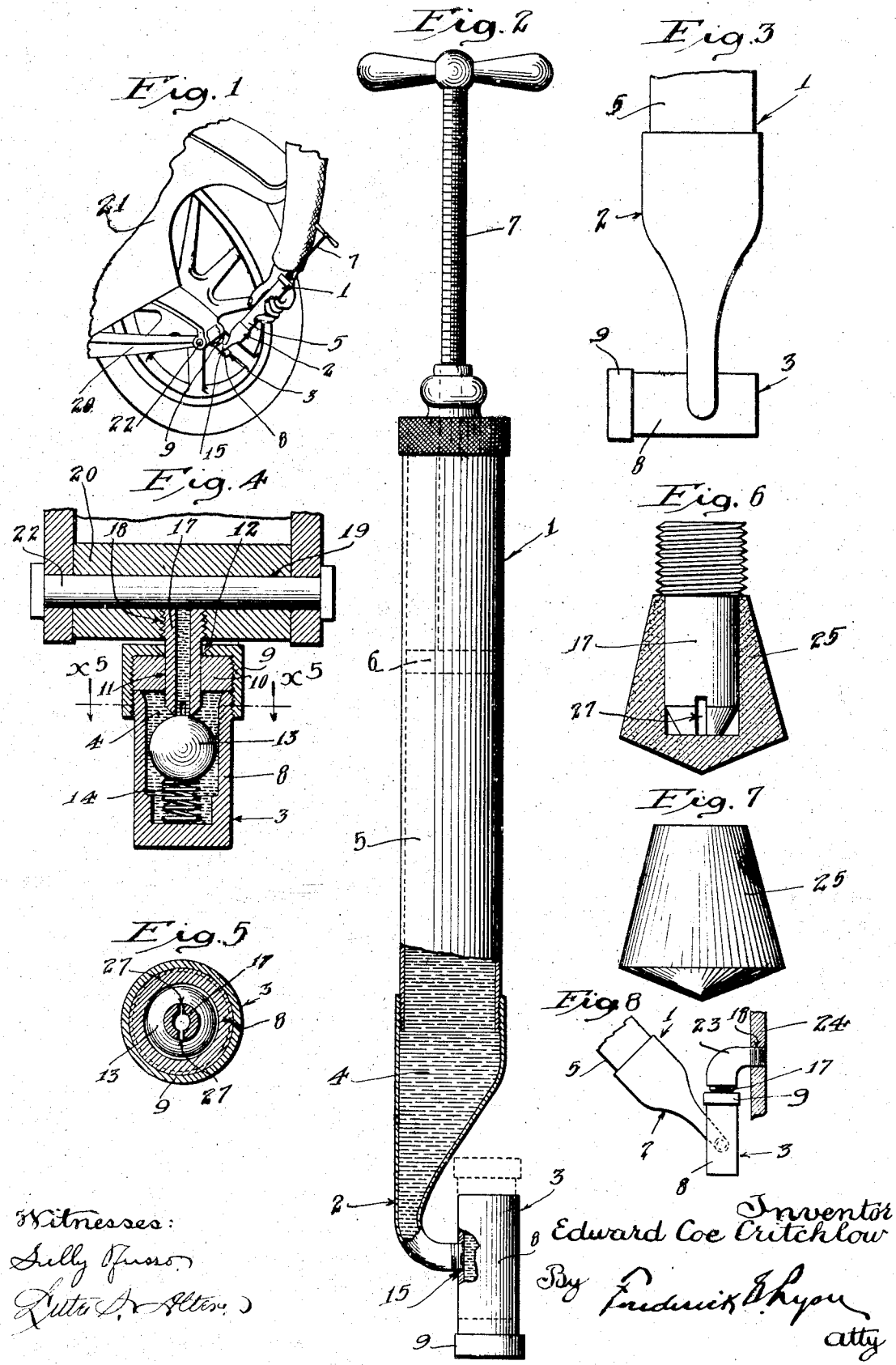

EDWARD COE CRITCHLOW, OF ORCUTT, CALIFORNIA.

LUBRICATOR.

1,325,002.      Specification of Letters Patent.      Patented Dec. 16, 1919.

Application filed April 16, 1919. Serial No. 290,549.

*To all whom it may concern:*

Be it known that I, EDWARD C. CRITCHLOW, a citizen of the United States, residing in the city of Orcutt, county of Santa Barbara, and State of California, have invented a certain new and useful Lubricator, of which the following is a specification.

This invention relates to a system whereby bearings and other parts of vehicles and machinery may be readily charged with grease or other lubricant. This system eliminates the use of the ordinary grease cups and operation of filling such grease cups with lubricant.

Objects of this invention in common with those of my copending application for patent filed January 30, 1919, Serial No. 274,061, are to facilitate the application of lubricant to the parts which require lubrication; to provide a construction which will prevent waste of the grease or other lubricant while the operation of applying the grease is proceeding; to provide a construction whereby the nozzle may be readily applied to variously located parts of a vehicle or other machine; and to provide for a tight and easily made connection between the part requiring lubrication and the lubricant force pump or gun.

In said prior application provision was made for connecting the valve chamber at its side or end to the pump tube so that the valve chamber could be applied to nipples positioned at various angles on the vehicle or machine. An object of this invention is to provide a construction whereby the valve chamber can be readily turned into different positions to change the direction of discharge relative to the axis of the grease pump without it being necessary to first detach the valve chamber and then apply it to the pump tube in a different position.

Another object is to provide a construction that facilitates packing or carrying of the grease gun and the parts attached thereto when the same are not in use.

Other objects and advantages will appear in the subjoined detailed description.

The accompanying drawings illustrate the invention.

Figure 1 is a perspective view disclosing the various elements of the system and showing the manner of application of the grease gun to one of the springs of a vehicle, a fragment of which is shown.

Fig. 2 is a side elevation, partly in mid section, of a lubricating system built in accordance with the provisions of this invention, the nipple for connecting the nozzle with the part to be lubricated not being shown in this view. The nozzle is shown in solid lines in one of its positions for use and in dotted lines in position for packing or carrying.

Fig. 3 is a side elevation of the lower portion of Fig. 2 from the left of said figure, the nozzle being turned with its longitudinal axis substantially at right angles to the longitudinal axis of the cylinder of the grease gun.

Fig. 4 is an enlarged sectional elevation of the nozzle and the nipple to which the nozzle is applied. This view also shows in section a vehicle spring to which the nipple is attached.

Fig. 5 is a plan section on line indicated by $x^5$—$x^5$, Fig. 4.

Fig. 6 is an enlarged side elevation of the nipple shown in Fig. 4, the resilient dust cap also being shown in position on the nipple and said dust cap being in section.

Fig. 7 is a side elevation of the dust cap shown in Fig. 6.

Fig. 8 is a fragmental elevation of the nozzle end of the gun, there also being shown an elbow nipple-extension screw-threaded into the part to be lubricated which is shown in section.

This invention provides a suitable lubricant force pump or gun 1 connected by a tube 2 with a suitable nozzle 3. The gun 1 may be of any construction capable of forcing the lubricant 4 therefrom through the tube 2 and nozzle 3. In the drawings the gun 1 comprises a cylinder 5 in which works a plunger 6 operated by a screw-threaded stem 7. This type of gun is well known and therefore it is readily understood that turning of the stem 7 in one direction will cause the plunger 6 to move toward the nozzle end of the cylinder 5 so as to bring pressure to bear upon the lubricant 4 to force the same from the gun.

The nozzle 3 is preferably constructed as follows: The nozzle 3 comprises a valve chamber 8 provided at one end with a cap 9 which may be screw-threaded or otherwise secured in place on the valve chamber. Inside of the cap 9 is a flexible or yielding washer 10 preferably of rubber or the like, said washer being provided with a hole 11 registering with a hole 12 in the cap 9, Adapted to seat against the washer 10 so as to normally close the hole 11 is a ball valve 13.

The pressure of the lubricant 4 upon the ball valve 13 may be sufficient to close the ball valve against the washer 10 to close the hole 11 when the system is not in use and therefore it is not absolutely necessary to employ a spring such as that indicated at 14 in Fig. 4. However, the use of the spring 14 is preferable so as to always insure against leakage of the lubricant through the hole 11 of the washer, said spring firmly holding the ball valve on its seat formed by the washer 10.

The valve chamber 8 is provided with a screw-threaded port 15 in its side wall to receive the tube 2. The tube 2 is reduced outwardly from substantially the diameter of the cylinder 5 to an angularly bent tip, the axis of the tip being substantially at right angles to the axis of the cylinder 5. Preferably also the reduction in diameter of the tube 2 is not symmetrical in respect to the longitudinal axis of the gun, the inner end of the tip 15 being eccentric to the longitudinal axis of the gun so that the nozzle will be substantially in alinement with the gun 1 when the nozzle is turned straight with the gun as in Fig. 2 of the drawings. The advantage of this construction just described is that the gun with the nozzle attached thereto can be more readily packed and carried than if the tip were not thus laterally offset. When the nozzle 3 is rotated on the tip 15 the path of rotation is in a plane parallel with the longitudinal axis of the gun so that the nozzle may be turned at different angles relative to the longitudinal axis of the gun without it being necessary to detach the nozzle and apply it to the tube 2 in a different position as in the hereinbefore identified co-pending application.

The parts of the vehicle or other machine requiring lubrication are provided with nipples corresponding with that shown at 17 in Figs. 4 and 6 of the drawings. In Fig. 4 the nipple 17 is shown screw-threaded into a hole 18 of a bearing 19 of a leaf spring 20. The spring 20 forms a portion of a vehicle which is fragmentarily shown at 21 in Fig. 1. The shackle bolt of the spring is shown at 22 and lubricant admitted through the nipple 17 lubricates the bearing surfaces of the spring 19 and bolt 22 as is readily understood. Some of the parts of the vehicle or other machine to be lubricated may be in such positions that if the nipple 17 were applied thereto directly the gun 1 could not be used because of interference of other parts of the vehicle. Therefore, in some instances an L 23, forming a nipple angle extension as in Fig. 8, may be employed and this L is shown screw-threaded into a member 24 which is to be supplied with lubricant. When the L 23 is employed, the nipple 17 will be permanently screw-threaded into said L. It is understood that each of the parts of the vehicle or other machine to be lubricated will be permanently provided with a nipple corresponding to the one shown in Fig. 4, and that the nipple may be provided with either male or female screw-threads.

Each of the nipples thus provided is normally covered with a resilient dust cap similar to that shown at 25 in Fig. 7. The dust cap 25 may be made of rubber or other resilient or spring material. The outer end of the nipple is provided with laterally extending openings in the form of slots 27 and the utility of these slots will be made clear hereinafter.

In practice, the system operates as follows: When it is desired to apply grease to the nipple 17 leading to any particular bearing surface of a vehicle or other machine, the dust cap 25 will be removed and the nozzle 3 will be brought into axial alinement with the nipple 17 and pressure will be applied to the nozzle to force the washer 10 upon the nipple 17. When the washer is thus forced over the nipple said nipple is sufficiently long to project beyond the inner face of the washer 10 so as to displace the ball valve 13 from its closed position against the washer, as in Fig. 4. The operator will then manipulate the stem 7 to bring pressure to bear upon the lubricant 4 and the lubricant will pass through the tube 2, thence through the valve chamber 8 and thence through the slots 27 into the nipple 17 to the parts to be lubricated. It is clear that if it were not for the slots 27 or equivalent construction the lubricant could not pass from the valve chamber 8 into the nipple because the ball valve 13 seats against the end of the nipple when the nozzle is in place on the nipple. The washer fits the nipple 17 tightly and thus prevents leakage of the lubricant around the nipple when the nozzle is in lubricant-applying position.

After the operator has forced the desired quantity of lubricant into the nipple 17, he will withdraw the nozzle 3 therefrom and replace the dust cap 25. When the operator withdraws the nozzle from the nipple, the pressure of the lubricant and spring upon the ball valve moves said valve into position against the washer 10 so as to close the hole 11, thus preventing the lubricant from oozing out of the gun. The operator will then proceed to apply lubricant to other parts of the vehicle in the same manner. In some instances it may be necessary in order to apply the nozzle to the nipple to change the position of the nozzle with reference to the tube 2 and this may be readily done as hereinbefore explained by simply turning the tube 2 about the axis of the bent tip of the tube 2 in a plane parallel with the longitudinal axis of the tube.

Another way of operating the system is to first produce pressure on the lubricant in the cylinder before the nozzle is applied to the nipple, and this may be done for the reason that the stem is screw-threaded into the cylinder and the ball valve prevents the outflow of the lubricant. After the stem has been rotated to produce the desired pressure upon the lubricant, the nozzle will be applied to the nipple as before, thus opening the ball valve and allowing the lubricant to flow into the nipple. This is quite an advantage as in many instances the stem cannot be handily operated when the nozzle is applied to the nipple and, if the pressure on the lubricant is not produced before applying the nozzle to the nipple, the operator will be required to employ both hands in the operation, one to hold the cylinder and the other to manipulate the stem. This noted advantage could not be obtained if the stem were not screw-threaded into the cylinder but merely reciprocated after the manner of the stems of many ordinary grease gun plungers, and, therefore I prefer to employ the screw-threaded stem as illustrated in Fig. 1 of the drawings.

From this it is readily understood that my system involves the employment of means to hold the plunger stem in pressure producing position so that the lubricant will be under pressure when the gun is applied to the nipple, these means being the screw-threads of the stem.

I claim:

In a lubricator, a grease gun, a tube connected with one end of the grease gun and having a top bent substantially at right angles to the longitudinal axis of the gun, and a valved nozzle rotatively connected at its side to the top, the path of rotation of the nozzle being in a plane parallel with the longitudinal axis of the gun.

Signed at Santa Maria, Cal., this 8th day of April, 1919.

EDWARD COE CRITCHLOW.

Witnesses:
WM. T. LAUGHLIN,
W. L. HOPKINS.